United States Patent [19]

Hayashida

[11] Patent Number: 5,599,892
[45] Date of Patent: Feb. 4, 1997

[54] PREPARATION OF POLYSILANES

[75] Inventor: Akira Hayashida, Kawasaki, Japan

[73] Assignee: Shin-Etsu Chemical Co., Ltd., Japan

[21] Appl. No.: 539,757

[22] Filed: Oct. 6, 1995

[30] Foreign Application Priority Data

Oct. 7, 1994 [JP] Japan ................ 6-270580

[51] Int. Cl.$^6$ ................................................ C08G 77/00
[52] U.S. Cl. ....................... 528/10; 528/37; 528/43; 556/430
[58] Field of Search ............... 528/37, 10, 43; 556/430

[56] References Cited

U.S. PATENT DOCUMENTS

| | | |
|---|---|---|
| 4,992,520 | 2/1991 | Zeigler ........................ 528/10 |
| 5,162,477 | 11/1992 | Mori et al. ................... 556/430 |

*Primary Examiner*—Melvyn I. Marquis
*Attorney, Agent, or Firm*—Millen, White, Zelano, & Branigan, P.C.

[57] ABSTRACT

In a process for preparing a polysilane from a diorganodihalosilane and an alkali metal, a low molecular weight polysilane results from the process as a by-product. The low molecular weight polysilane is further reacted with an alkali metal for conversion into a high molecular weight polysilane.

26 Claims, 1 Drawing Sheet

COMPARATIVE EXAMPLE 1

EXAMPLE 1

PREPARATION OF POLYSILANES

BACKGROUND OF THE INVENTION

1. Field of the Invention

This invention relates to an improvement in the preparation of polysilanes according to a conventional Wurtz condensation method and more particularly, to a method of preparing high molecular weight polysilanes in high yields.

2. Prior Art

Polysilanes are regarded useful as precursors for silicon carbide ceramics, photoresist materials, photo-polymerization initiators, photoconductive materials, and non-linear optical materials. Since the discovery of soluble polysilanes (West, R. et al., J. Am. Chem. Soc., 1981, 103, 7352), researchers have strived for the development of a preparation method and application of polysilanes.

In the prior art, polysilanes are generally prepared by desalting condensation reaction of diorganodihalosilanes with alkali metals, which is known as Wurtz condensation method (see Kipping, F. S., J. Chem. Soc., 1921, 119, 830, and Burkhard, C., J. Am. Chem. Soc., 1949, 71, 963).

Although polysilanes can be prepared by the Wurtz condensation methods, they are obtained in low yields. Especially high molecular weight polysilanes which are regarded important from the standpoint of ease of handling in forming steps including film formation and spinning as well as formability are available in very low yields. By effecting reaction in aromatic solvents such as toluene or ether solvents, the yield of polysilanes can be increased at the sacrifice of molecular weight. For example, the proportion of high molecular weight polysilanes produced is only 20% in aromatic solvents and almost nil in ether solvents.

On the contrary, reaction in alkanes is known as effective for increasing the molecular weight while the percent yield can be increased by increasing the reaction temperature. Then the reaction in alkanes is advantageous when high molecular weight polysilanes are desired. For example, Trujillo (J. Organomet. Chem., 1980, 198, C27) and Taylor (GB 87-10531 or JP-A 286433/1988) reported that polymethylphenylsilane was obtained in yields of 65% and 57%, respectively. Their actual yields are 43% and 35% when a polysilane fraction having low dispersity is collected by a re-precipitation purification technique. Zeigler et al. disclose in WO 87-06234 or Japan Phase Publication 503237/1989 a process for preparing a polysilane in high yields by adjusting a relative solubility parameter with a solvent, but the yield is at most 45%.

The reason why the percent yield of high molecular weight polysilanes is low is that when diorganodihalosilanes are reacted with alkali metals, cyclic or chainlike oligosilanes and low molecular weight polysilanes are inevitably formed in addition to high molecular weight polysilanes, resulting in low yields of high molecular weight ones.

There is a demand for a method capable of preparing high molecular weight polysilanes in high yields.

SUMMARY OF THE INVENTION

Therefore, an object of the present invention is to provide a commercially acceptable method for preparing high molecular weight polysilanes in high yields.

When a diorganodihalosilane is reacted with an alkali metal to form a high molecular weight polysilane (referred to as an inherent high molecular weight polysilane hereinafter for discrimination purpose only), low molecular weight polysilanes including cyclic or chainlike oligosilanes are concurrently formed as by-products. These by-products are referred to as low molecular weight products, hereinafter. We have found that these concomitant low molecular weight products can be reacted with an alkali metal again to form polysilanes.

More particularly, in the Wurtz condensation method using alkali metals, the reaction solution at the end of reaction is usually contacted with alcohol or water for the purpose of establishing safety against the alkali metal during subsequent treatment of the reaction solution or removing the alkali metal ions or halide ions. The contact with alcohol or water converts the alkali metal into a safe state, but at the same time, chlorine atoms attached to the end of concomitant low molecular weight products are subject to alcoholysis or hydrolysis to form silanols or siloxanes which no longer participate in reaction with alkali metal. The thus converted silanols and siloxanes must be discarded unless these by-products can find use in a new area. This leads to an increase of manufacturing cost.

Quite unexpectedly, we have found that when the low molecular weight products are subject again to reaction between diorganodihalosilane and alkali metal without contact with alcohol or water, their molecular weight is increased eventually to the same extent as the inherent high molecular weight polysilane. Additionally, when the low molecular weight products are subject to the reaction along with an additional amount of diorganodihalosilane monomer, there is obtained a high molecular weight polysilane in a significantly larger amount than the amount of the inherent high molecular weight polysilane.

Moreover, when a diorganodihalosilane is reacted with an alkali metal to form an inherent high molecular weight polysilane, low molecular weight products are concomitantly formed as previously mentioned. The inherent high molecular weight polysilane is generally insoluble in aliphatic hydrocarbon solvents and after the reaction, is present in a solvent-insoluble state together with the by-produced alkali metal halide while the low molecular weight products are soluble in the solvent. Accordingly, by filtering the reaction mixture into solids and a filtrate and adding a diorganodihalosilane and an alkali metal to the filtrate for effecting reaction again, a high molecular weight polysilane can be produced in high yields.

Briefly stated, the present invention provides a process for preparing a polysilane from a diorganodihalosilane and an alkali metal, wherein a low molecular weight polysilane resulting from the process as a by-product is reacted with an alkali metal for conversion into a high molecular weight polysilane. In one preferred embodiment, the low molecular weight polysilane is reacted with an alkali metal along with an additional amount of the diorganodihalosilane.

In another aspect, the present invention provides a process for preparing a polysilane comprising the steps of: reacting a diorganodihalosilane with an alkali metal in an aliphatic hydrocarbon solvent; filtering the reaction solution; and adding a diorganodihalosilane and an alkali metal to the filtrate for further reaction, thereby converting a low molecular weight polysilane in the filtrate into a high molecular weight polysilane.

BEST MODE FOR CARRYING OUT THE INVENTION

Figure 1:
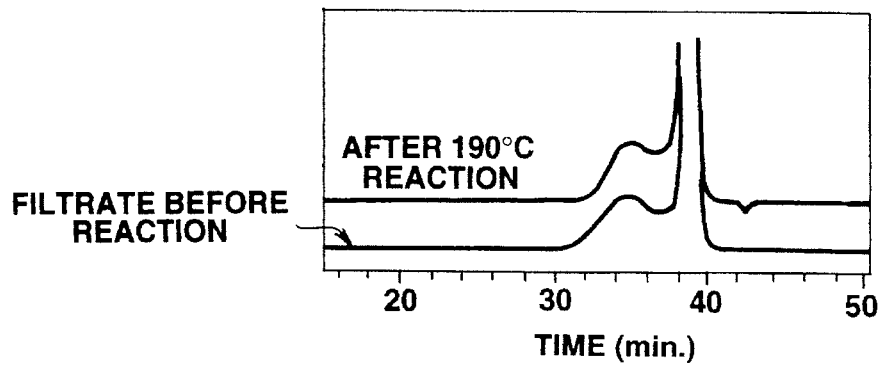
FIG. 1 illustrates GPC charts of a reaction product using a post-treated low molecular weight product in Comparative Example 1.

The process of the present invention uses a diorganodihalosilane and an alkali metal. The diorganodihalosilane is preferably a silicon compound of the following general formula (1) or a mixture of a silicon compound of formula (1) and a silicon compound of the following general formula (2).

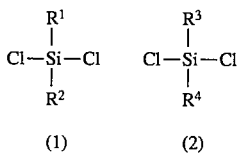

(1)  (2)

$R^1$ to $R^4$, which may be identical or different, are a hydrogen atom or a substituted or unsubstituted monovalent hydrocarbon group having 1 to 18 carbon atoms, preferably 1 to 12 carbon atoms. Examples of the monovalent hydrocarbon group are alkyl groups such as methyl, ethyl, propyl and butyl, alkenyl groups such as vinyl and allyl, aryl groups such as phenyl, and aralkyl groups such as benzyl.

The alkali metal used herein is lithium, sodium or potassium, with the sodium being preferred. The amount of alkali metal used is preferably 1 to 1.5 equivalents, more preferably 1.05 to 1.3 equivalents relative to the diorganodihalosilane. Less than 1 equivalent of the alkali metal means shortage of the condensation agent which would lead to a lowering of yield. Also as low molecular weight products are frequently recycled for reuse, the proportion of low molecular weight products in the reaction solution gradually increases, probably resulting in imbalance of reactants. Use of more than 1.5 equivalents of the alkali metal would provide no further contribution to yield improvement and molecular weight increase.

Preferably the solvents used herein are aliphatic hydrocarbon solvents such as hexane, octane and dodecane because they are stable to the diorganodihalosilane and alkali metal. Although aromatic hydrocarbon solvents and ether solvents in which high molecular weight polysilanes are well soluble are effective as reaction solvents, they are undesirable because of difficult separation by filtration between high and low molecular weight products after reaction.

The reaction temperature is preferably at least above the melting point of the alkali metal. Although reaction can proceed at temperatures below the melting point of the alkali metal, a low reaction rate and hence, a longer time needed until the completion of reaction lead to an economic disadvantage. The reaction temperature is also correlated to the solubility of the resulting high molecular weight polysilanes and dictates the molecular weight of the resulting polysilanes. More particularly, the higher the reaction temperature, the wider becomes the molecular weight range of polysilanes which are soluble in the reaction solvent. Such polysilanes in solution state participate in reaction with the alkali metal for converting into higher molecular weight polysilanes. Once the molecular weight of polysilanes is increased to the range which is no longer soluble in the reaction solvent, those high molecular weight polysilanes are excluded from the reaction system in a state insoluble in the solvent. In this way, the molecular weight of polysilanes which are insoluble in the solvent at the end of reaction increases as the reaction temperature increases. This enables adjustment of the molecular weight of polysilanes by controlling the reaction temperature.

The reaction is exothermic. It is necessary to continue the reaction at least until the reaction ceases heat release. The end of heat release can be detected in various ways. Where reaction is carried out under reflux of the solvent, the end of heat release is detectable from a change of the amount of refluxing solvent. Where reaction is carried out at a controlled temperature below the boiling point of the solvent, the output of a heater used for temperature control is monitored. Preferably the reaction time is within 2 hours, especially within one hour. Longer reaction times in excess of 2 hours are uneconomical because the yield and molecular weight of polysilane are increased little further.

An inert atmosphere such as nitrogen gas is preferred as the reaction atmosphere since contact with water and air should be avoided.

After the reaction mixture is reacted under the abovementioned conditions, the resulting polysilanes are collected therefrom. In one embodiment, the reaction solution is cooled and passed through a filter under an inert atmosphere to separate into a filter residue and a filtrate. Upon cooling, not only high molecular weight products which are already insoluble at the selected reaction temperature, but also lower molecular weight polysilanes precipitate from the reaction mixture. Where it is desired to collect only a fraction of high molecular weight products which are already insoluble at the selected reaction temperature, the low molecular weight polysilane precipitate which is unnecessary is separated in a subsequent purifying step and discarded. This embodiment is less desirable in this regard. It is then recommended that filtration of the reaction solution be done at a temperature equal or approximate to the reaction temperature because lower molecular weight polysilanes remain soluble and are left in the filtrate side so that they can thereafter be subject to reaction again. The load of the purifying step is reduced. This preferred embodiment provides an effective process for preparing high molecular weight polysilanes in a narrow molecular weight range. Filtration should be done in an inert atmosphere and the filtrate is thereafter subject to reaction in an inert atmosphere while avoiding any contact with alcohol, water and air.

According to the present invention, the thus separated low molecular weight polysilane fraction, typically the filtrate is subject to reaction again by adding thereto an alkali metal, preferably an alkali metal and a diorganodihalosilane. The filtrate collected by filtration of the reaction solution may be subject to reaction without further treatment. Various procedures may be employed to effect reaction again. The second stage of reaction may be carried out, for example, by (1) adding an amount of an alkali metal to the filtrate, heating the filtrate to a predetermined temperature, and adding an amount of a diorganodihalosilane dropwise, or (2) adding an amount of a diorganodihalosilane to the filtrate, heating the filtrate to a predetermined temperature, and gradually adding an amount of an alkali metal in solid state or in liquid state (after heating and melting the metal). An alternative is (3) a continuous reaction procedure of continuously feeding equivalent amounts of a mixture of the filtrate and a diorganodihalosilane and an alkali metal to a reaction tank and sequentially removing the reaction solution therefrom.

The amount and type of diorganodihalosilane used in the second stage may be the same as in the first stage. Since the low molecular weight product contained in the filtrate is added to the same amount of diorganodihalosilane as used in the first stage, the reaction mixture of the second stage has a higher concentration of silicon compounds. Then the reaction mixture of the second stage may be diluted if desired. However, since the component in the reaction mixture from the first stage that will obstruct agitation is mainly the sodium chloride by-product, the addition to the system of the low molecular weight product having completed desalting condensation to a substantial extent does not affect agitation and reaction. There is no need to dilute the reaction mixture of the second stage as a general rule. Therefore, the solvent in the filtrate may be used as such. That is, it is only necessary that a diorganodihalosilane and an alkali metal be added to the filtrate for reaction and there is no need to add an extra solvent. Usually, the preferred amount of the solvent used is at least 300 ml, especially at least 500 ml per mole of the diorganodihalosilane. The preferred amount of the alkali metal added in the second stage is about 1 to 1.5 equivalents relative to the total of the low molecular weight product in the filtrate and the newly added diorganodihalosilane. The reaction conditions are the same as in the first stage.

In the practice of the present invention, the second stage procedure may be repeated.

The filter residue collected by filtration of the reaction solution (from both the first and second stages) is contacted with alcohol or water for treating the residual alkali metal and dissolving away the alkali metal halide and collecting a crude high molecular weight polysilane fraction which is further purified. The purifying method is well known in the literature and patents. One typical purifying method is a so-called re-crystallization or re-precipitation method involving dissolving the crude high molecular weight polysilane fraction in a good solvent and then adding a poor solvent for solidifying the polysilanes.

In the present invention, a low molecular weight polysilane having a weight average molecular weight of less than 100,000 is converted into a high molecular weight polysilane having a higher weight average molecular weight than the starting polysilane, desirably more than 100,000. More preferably, a low molecular weight polysilane having a weight average molecular weight of less than 50,000 is converted into a high molecular weight polysilane having a higher weight average molecular weight than the starting polysilane, desirably more than 50,000, more desirably more than 100,000. Most preferably, a low molecular weight polysilane having a weight average molecular weight of less than 30,000, preferably less than 20,000, more preferably less than 10,000 is converted into a high molecular weight polysilane having a weight average molecular weight of more than 50,000, desirably more than 100,000.

The polysilanes obtained by the process of the invention are represented by the following general formula (3) when diorganodihalosilanes of formulae (1) and (2) are used.

In formula (3), $R^1$ to $R^4$ are as defined previously, letter n is an integer of 1 or more, m is an integer of 0 or more, and $n+m \geq 10$.

As to the percent yield of polysilane, many values were reported in connection with the prior art methods. These yield values cover a very wide molecular weight range of polysilanes. An attempt to collect a fraction of high molecular weight polysilanes having a weight average molecular weight of about 100,000 or more requires purification of the polysilane product which always results in a substantial drop of percent yield. In contrast, the high molecular weight polysilane product obtained by the process of the invention has a narrow molecular weight distribution. That is, a fraction of high molecular weight polysilanes having a weight average molecular weight of about 100,000 or more is obtained in a simple way and in high yields.

According to the present invention, a low molecular weight polysilane product containing cyclic or chainlike oligosilanes resulting as by-products from the preparation of polysilanes from a diorganodihalosilane and an alkali metal is again subject to reaction with an alkali metal along with a diorganodihalosilane without contact with alcohol or water, thereby converting the low molecular weight polysilanes into high molecular weight ones. Then high molecular weight polysilanes are obtained in high yields and in an economically acceptable manner.

EXAMPLE

Examples of the present invention are given below by way of illustration and not by way of limitation.

Reference Example 1

A 300-ml four-necked round bottom separable flask equipped with a stirrer, Dimroth condenser, thermometer, and 50-ml dropping funnel was purged with dry nitrogen and allowed to stand overnight. The flask was charged with 5.06 g (0.22 mol) of metallic sodium and 140 ml of dry dodecane and heated to 190° C. in an oil bath. The dropping funnel was charged with 19.1 g (0.1 mol) of phenylmethyldichlorosilane, which was added dropwise to the flask over 15 minutes while maintaining the flask at a temperature of 190° C. After the completion of dropwise addition, the reaction mixture was maintained at the temperature of 190° C. for a further 45 minutes and then cooled to terminate the reaction. Then in a nitrogen stream, the reaction solution was passed through a glass filter and washed with 10 ml of dodecane, obtaining a filter residue and a filtrate.

The residue was thoroughly washed with n-octane, then with methanol, and finally with water and dried, collecting 8.6 g of a crude product (yield 71%). The crude polysilane product was analyzed by gel permeation chromatography (GPC) to find a weight average molecular weight (Mw) of 138,000. The crude product was dissolved in 260 ml of toluene, washed three times with water using a separatory funnel, and dried over magnesium sulfate, followed by filtration. With stirring by a magnetic stirrer, 500 ml of acetone was gradually added to the collect, which was re-precipitated therefrom. Filtration and drying gave 5.2 g of a purified polysilane product (yield 43%, weight average molecular weight 198,000).

Comparative Example 1

The filtrate obtained in Reference Example 1 was divided into two parts. One part was washed three times with water using a separatory funnel and dried over magnesium sulfate. On GPC analysis, the solution was found to contain low molecular weight oligosilanes (see the chromatogram labeled "filtrate before reaction" in FIG. 1).

To this dodecane solution containing a low molecular weight product was added 0.5 g of metallic sodium. The solution was heated to 190° C. and maintained at the temperature for 4½ hours. The reaction solution was treated as in Reference Example 1. The chromatogram of GPC analysis labeled "after 190° C. reaction" in FIG. 1 is the same as that before reaction, with no indication of a molecular weight increase recognized.

Example 1

Figure 2:
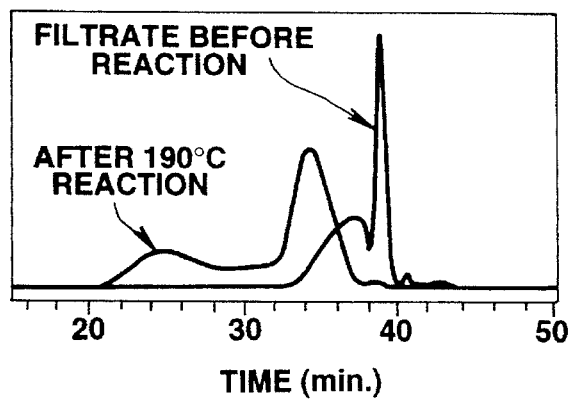
FIG. 2 illustrates GPC charts of a reaction product using an intact low molecular weight product in Example 1.

The other part of the filtrate divided in Comparative Example 1 was used as such. In a nitrogen atmosphere, 0.5 g of metallic sodium was added to the other part, which was maintained at 190° C. for 3 hours. GPC analysis revealed an apparent increase of molecular weight as shown in FIG. 2.

Examples 2–6

Polysilane synthesis was carried out as in Reference Example 1. By filtration of the reaction solution, there were obtained a filter residue and a filtrate. The residue was worked up as in Reference Example 1 and reported as Reference Example 2.

The filtrate was admitted into a flask to which 5.06 g of metallic sodium was added. The flask was heated to 190° C. A dropping funnel was charged with 19.1 g of phenylmethyldichlorosilane, which was added dropwise to the flask over 15 minutes while maintaining the flask at a temperature of 190° C. After the completion of dropwise addition, the reaction mixture was maintained at the temperature of 190° C. for a further 45 minutes and then cooled to terminate the reaction. By filtration of the reaction solution, there were obtained a filter residue and a filtrate. The residue was worked up as in Reference Example 1 and reported as Example 2. The filtrate was recycled by subjecting it to further reaction as above. The reaction procedure was repeated four times (Examples 3 to 6).

Each of the crude products was dissolved in toluene to a concentration of 10% by weight. Acetone was added to the solution in an amount of twice the volume of toluene used, causing re-precipitation. The results are shown in Table 1.

TABLE 1

|  | Crude product | | Purified product | |
| --- | --- | --- | --- | --- |
|  | Yield (g) | Mw | Yield (g) | Mw |
| Reference 2 | 8.7 | 141,000 | 5.2 | 207,000 |
| Example 2 | 10.8 | 157,000 | 6.3 | 247,000 |
| Example 3 | 10.3 | 190,000 | 6.0 | 202,000 |
| Example 4 | 10.7 | 162,000 | 6.1 | 215,000 |
| Example 5 | 10.9 | 158,000 | 6.2 | 230,000 |
| Example 6 | 11.0 | 143,000 | 6.4 | 199,000 |

Figure 3:
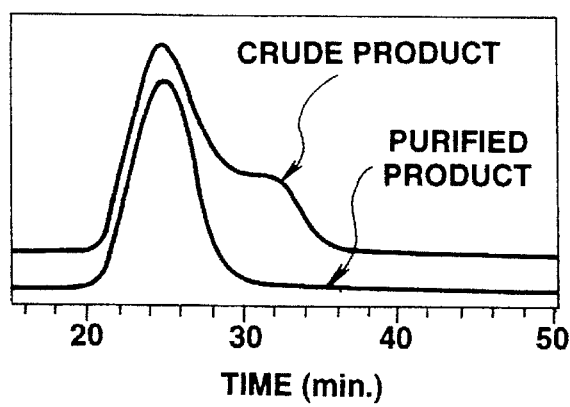
FIG. 3 illustrates GPC charts of crude and pure polysilane products of Example 2.

The total amount of phenylmethyldichlorosilane used in the five reaction procedures was 95.5 g. On the basis of this total amount, the percent yields of the crude product and purified product of the five procedures are calculated to be 89.5% and 51.7%, respectively, indicating improvements in yield. The crude product and purified product of Example 2 were analyzed by GPC, with the chromatograms shown in FIG. 3.

Examples 7–9

Polysilane synthesis was carried out as in Reference Example 1. By filtration of the reaction solution, there were obtained a filter residue and a filtrate. The residue was worked up as in Reference Example 1 and reported as Reference Example 3.

The filtrate was admitted into a flask together with 19.1 g of phenylmethyldichlorosilane. The flask was heated to 190° C. To the flask, 12.65 g of a metallic sodium dispersion (manufactured by Aldrich K. K., 40% dispersion in gas oil) was gradually added over 10 minutes. The reaction mixture was maintained at the temperature of 190° C. for a further 45 minutes and then cooled to terminate the reaction. By filtration of the reaction solution, there were obtained a filter residue and a filtrate. The residue was worked up as in Reference Example 1 and reported as Example 7. The filtrate was recycled by subjecting it to further reaction as above. The reaction procedure was repeated two times (Examples 8 and 9). The results are shown in Table 2.

TABLE 2

|  | Crude product | | Purified product | |
| --- | --- | --- | --- | --- |
|  | Yield (g) | Mw | Yield (g) | Mw |
| Reference 3 | 8.5 | 143,000 | 5.1 | 205,000 |
| Example 7 | 10.9 | 164,000 | 6.1 | 201,000 |
| Example 8 | 10.7 | 151,000 | 6.0 | 211,000 |
| Example 9 | 10.6 | 135,000 | 6.2 | 225,000 |

The total amount of phenylmethyldichlorosilane used in the three reaction procedures was 57.3 g. On the basis of this total amount, the percent yields of the crude product and purified product of the three procedures are calculated to be 89.4% and 50.8%, respectively, indicating improvements in yield.

Examples 10–12

Polysilane synthesis was carried out as in Reference Example 1. After the completion of reaction, the reaction solution was passed through a glass filter in a closed system without cooling the solution. The filter residue was worked up as in Reference Example 1 and reported as Reference Example 4.

The filtrate was admitted into a flask together with 19.1 g of phenylmethyldichlorosilane. The flask was heated to 190° C. Reaction was carried out as in Example 5. By filtration of the reaction solution, there were obtained a filter residue and a filtrate. The residue was worked up as in Reference Example 1 and reported as Example 10. The filtrate was recycled by subjecting it to further reaction as above. The reaction procedure was repeated two times (Examples 11 and 12). The results are shown in Table 3.

TABLE 3

|  | Crude product | | Purified product | |
| --- | --- | --- | --- | --- |
|  | Yield (g) | Mw | Yield (g) | Mw |
| Reference 4 | 7.6 | 208,000 | 6.0 | 213,000 |
| Example 10 | 9.2 | 201,000 | 8.5 | 220,000 |
| Example 11 | 8.9 | 216,000 | 8.2 | 231,000 |
| Example 12 | 9.0 | 197,000 | 8.0 | 229,000 |

The total amount of phenylmethyldichlorosilane used in the three reaction procedures was 57.3 g. On the basis of this total amount, the percent yields of the crude product and purified product of the three procedures are calculated to be 75.2% and 68.6%, respectively. Filtration of the hot reaction solution increased the proportion of reusable low molecular weight product, resulting in a marked improvement in polysilane yield.

Japanese Patent Application No. 270580/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

I claim:

1. In a process for preparing a polysilane from a diorganodihalosilane and an alkali metal, the improvement wherein a low molecular weight polysilane resulting from the process as a byproduct is reacted with an alkali metal for conversion into a higher molecular weight polysilane.

2. The improvement of claim 1 wherein the low molecular weight polysilane is reacted with an alkali metal along with a diorganodihalosilane.

3. A process for preparing a polysilane comprising the steps of:

reacting a diorganodihalosilane with an alkali metal in an aliphatic hydrocarbon solvent, filtering the reaction solution, the resulting filtrate containing a low molecular weight polysilane, and adding a diorganodihalosilane and an alkali metal to the filtrate for further reaction thereby converting the diorganodihalosilane into a polysilane and at the same time the low molecular weight polysilane into a higher molecular weight polysilane.

4. The process of claim 3, wherein the filtering step and the step of adding a diorganodihalosilane and alkali metal are repeated at least once.

5. The process of claim 3, wherein the step of reacting diorganodihalosilane with an alkali metal and aliphatic hydrocarbon solvent produces high molecular weight polysilane which is recovered in the step of filtering the reaction solution.

6. A process as in claim 5, wherein the filtering step and step of adding a diorganodihalosilane and alkali metal are repeated from one to three times.

7. In a process for preparing a polysilane from a diorganodihalosilane and an alkali metal, the improvement wherein a low molecular weight polysilane resulting from the process as a byproduct, which has not contacted alcohol or water, is reacted with an alkali metal for conversion into a higher molecular weight polysilane.

8. A process as in claim 7, wherein the low molecular weight polysilane has a weight average molecular weight of less than 100,000 and the higher molecular weight polysilane has a weight average molecular weight of more than 100,000.

9. A process as in claim 7, wherein the low molecular weight polysilane has a weight average molecular weight of less than 50,000 and is converted into a higher molecular weight polysilane with a weight average molecular weight of more than 50,000.

10. A process as in claim 8, wherein the low molecular weight polysilane has a weight average molecular weight of less than 30,000.

11. A process as in claim 8, wherein the low molecular weight polysilane has a weight average molecular weight of less than 20,000.

12. A process as in claim 8, wherein the low molecular weight polysilane has a weight average molecular weight of less than 10,000.

13. A process as in claim 9, wherein the low molecular weight polysilane is converted into a higher molecular weight polysilane having a weight average molecular weight of greater than 100,000.

14. A process as in claim 9, wherein the low molecular weight polysilane has a weight average molecular weight of less than 30,000.

15. A process as in claim 9, wherein the low molecular weight polysilane has a weight average molecular weight of less than 20,000.

16. A process as in claim 9, wherein the low molecular weight polysilane has a weight average molecular weight of less than 10,000.

17. A process as in claim 3, wherein the low molecular weight polysilane has a weight average molecular weight of less than 100,000 and is converted to a higher weight average molecular weight polysilane with a weight average molecular weight of more than 100,000.

18. A process as in claim 3, wherein the low molecular weight polysilane has a weight average molecular weight of less than 50,000 and is converted into a higher molecular weight polysilane with a weight average molecular weight of more than 50,000.

19. A process as in claim 17, wherein the low molecular weight polysilane has a weight average molecular weight of less than 30,000.

20. A process as in claim 17, wherein the low molecular weight polysilane has a weight average molecular weight of less than 20,000.

21. A process as in claim 17, wherein the low molecular weight polysilane has a weight average molecular weight of less than 10,000.

22. A process as in claim 18, wherein the low molecular weight polysilane is converted into a higher molecular weight polysilane having a weight average molecular weight of greater than 100,000.

23. A process as in claim 18, wherein the low molecular weight polysilane has a weight average molecular weight of less than 30,000.

24. A process as in claim 18, wherein the low molecular weight polysilane has a weight average molecular weight of less than 20,000.

25. A process as in claim 18, wherein the low molecular weight polysilane has a weight average molecular weight of less than 10,000.

26. A process for preparing a polysilane comprising the steps of:

reacting a diorganohalosilane with an alkali metal and an aliphatic hydrocarbon solvent to produce a high molecular weight polysilane having a weight average molecular weight greater than 50,000, filtering the reaction solution to recover said high weight average molecular weight polysilane, the resulting filtrate containing a low molecular weight polysilane having a weight average molecular weight less than 50,000, and adding a diorganodihalosilane and an alkali metal to the filtrate for further reaction, thereby converting the diorganodihalosilane into a polysilane and at the same time, the low weight average molecular weight polysilane into a higher molecular weight polysilane.

* * * * *